United States Patent
Xu et al.

(10) Patent No.: US 12,268,231 B2
(45) Date of Patent: Apr. 8, 2025

(54) PESTICIDE RESIDUE REMOVAL DEVICE FOR REFRIGERATOR, AND REFRIGERATOR

(71) Applicants: QINGDAO HAIER REFRIGERATOR CO., LTD., Shandong (CN); HAIER SMART HOME CO., LTD., Shandong (CN)

(72) Inventors: Tong Xu, Qingdao (CN); Ming Wang, Qingdao (CN); Wenchun Wang, Qingdao (CN); Chunyang Li, Qingdao (CN)

(73) Assignees: QINGDAO HAIER REFRIGERATOR CO., LTD., Shandong (CN); HAIER SMART HOME CO., LTD., Shandong (CN)

( * ) Notice: Subject to any disclaimer, the term of this patent is extended or adjusted under 35 U.S.C. 154(b) by 267 days.

(21) Appl. No.: 17/789,733

(22) PCT Filed: Dec. 30, 2020

(86) PCT No.: PCT/CN2020/141519
§ 371 (c)(1),
(2) Date: Jun. 28, 2022

(87) PCT Pub. No.: WO2021/139585
PCT Pub. Date: Jul. 15, 2021

(65) Prior Publication Data
US 2023/0061464 A1    Mar. 2, 2023

(30) Foreign Application Priority Data

Jan. 6, 2020 (CN) .................. 202010011613.0

(51) Int. Cl.
*A23L 5/20* (2016.01)
*A23L 3/00* (2006.01)
(Continued)

(52) U.S. Cl.
CPC ............... *A23L 5/276* (2016.08); *A23L 3/001* (2013.01); *A23L 3/003* (2013.01); *A23L 3/358* (2013.01);
(Continued)

(58) Field of Classification Search
CPC .... A23L 3/3409; A23L 3/34095; A23L 3/358; A23L 3/3589; A23L 5/276
See application file for complete search history.

(56) References Cited

U.S. PATENT DOCUMENTS 4,410,339 A * 10/1983 Bachhofer ............ F24F 8/133
422/123
6,162,477 A * 12/2000 Crisinel .................. A23L 5/276
426/643
(Continued)

FOREIGN PATENT DOCUMENTS

| CN | 201085014 Y | 7/2008 |
|---|---|---|
| CN | 202445904 U | 9/2012 |

(Continued)

OTHER PUBLICATIONS

CN1989383A Machine Translation (Year: 2007).*
(Continued)

*Primary Examiner* — Spencer E. Bell
(74) *Attorney, Agent, or Firm* — ALSTON & BIRD LLP

(57) ABSTRACT

A pesticide residue removal device for a refrigerator, and a refrigerator are provided. The pesticide residue removal device includes: an ozone generator configured to generate ozone; an ozone water container configured to store water therein, where the ozone water container communicates with the ozone generator, so that ozone is dissolved into water of the ozone water container to obtain ozone water; and an atomizer communicating to the ozone water container, receiving and atomizing the ozone water, and supplying the (Continued)

ozone water to a storage space of the refrigerator. The generated ozone water is atomized to fully fill the entire storage compartment of the refrigerator to achieve effective pesticide residue removal and sterilization; ozone water can be prepared on demand to reduce waste; and people are well prevented from getting harmed at an excessive ozone concentration.

8 Claims, 3 Drawing Sheets

(51) Int. Cl.
    *A23L 3/358*     (2006.01)
    *A23L 3/3589*     (2006.01)
    *B01F 23/237*     (2022.01)
    *B01F 35/83*     (2022.01)
    *B01F 101/00*     (2022.01)
    *F25D 17/04*     (2006.01)

(52) U.S. Cl.
    CPC .... *A23L 3/3589* (2013.01); *B01F 23/237613* (2022.01); *B01F 35/833* (2022.01); *F25D 17/042* (2013.01); *A23V 2002/00* (2013.01); *B01F 2101/305* (2022.01); *F25D 2317/0416* (2013.01)

(56) References Cited

U.S. PATENT DOCUMENTS

2006/0130498 A1   6/2006   Joshi et al.
2010/0223944 A1   9/2010   Tsujimoto et al.
2013/0259989 A1   10/2013   Nakamura

FOREIGN PATENT DOCUMENTS

| | | |
|---|---|---|
| CN | 203798077 U | 8/2014 |
| CN | 104185429 A | 12/2014 |
| CN | 205026850 U | 2/2016 |
| CN | 1989383 A | 6/2017 |
| CN | 201012186 Y | 1/2018 |
| CN | 109737537 A | 5/2019 |
| CN | 112284028 A | 1/2021 |
| JP | 2001-061460 A | 3/2001 |
| JP | 2007040681 A | 2/2007 |
| JP | 2007101023 A | 4/2007 |
| JP | 4-688622 B2 | 5/2011 |
| JP | 2016-061476 A | 4/2016 |
| JP | 2018-200171 A | 12/2018 |
| JP | 2019052846 A | 4/2019 |
| WO | WO 2019/037616 A1 | 2/2019 |

OTHER PUBLICATIONS

Partial Supplementary European Search Report for EP Patent Application No. 20911809.0 dated Nov. 23, 2022 (12 pages).
European Search Report for EP Patent Application No. 20911809.0 dated Feb. 24, 2023 (6 pages).
1$^{st}$ Office Action for EP Patent Application No. 20911809.0 dated Mar. 9, 2023 (7 pages).
Decision of Rejection for China Patent Application No. 202010011613.0 dated Apr. 29, 2022 (4 pages).
International Search Report and Written Opinion for PCT/CN2020/141519 (ISA/CN) mailed Mar. 25, 2021 (12 pages).
1$^{st}$ Office Action for Chinese Patent Application No. 202010011613.0 dated Jan. 6, 2020 (7 pages).
2$^{nd}$ Office Action for Chinese Patent Application No. 202010011613.0 dated Jan. 19, 2022 (5 pages).
2nd Office Action for European Patent Application No. 20911809.0 dated Aug. 2, 2023 (7 pages).

\* cited by examiner

PESTICIDE RESIDUE REMOVAL DEVICE FOR REFRIGERATOR, AND REFRIGERATOR

CROSS-REFERENCE TO RELATED APPLICATIONS

The present application is a national phase entry of International Application No. PCT/CN2020/141519, filed Dec. 30, 2020, which claims priority to Chinese Patent Application No. 202010011613.0, filed Jan. 6, 2020, which are each incorporated herein by reference in their entirety.

FIELD OF THE INVENTION

The present invention relates to the technical field of refrigerators, and in particular to a pesticide residue removal device for a refrigerator, and a refrigerator.

BACKGROUND OF THE INVENTION

Fruits and vegetables are indispensable food in people's daily life. As pests and diseases increase, more and more pesticides are used. In recent years, there have been numerous reports of excessive pesticide residues in fruit and vegetable products. If pesticides get into human body, it will cause acute poisoning and even endanger life. As a result, people are increasingly concerned about food safety.

In order to prevent pesticides from getting into human body, it is necessary to remove pesticide residues from fruits and vegetables before they are eaten. The existing main technologies for removing pesticide residues include ultraviolet rays, ozone, or ozone water, etc. In the way of using ultraviolet rays, it is difficult to remove the pesticide residues inside leafy vegetables or fruits such as grapes. In the way of using ozone, an ozone concentration that exceeds a certain limit will cause certain harm to people, resulting in a lower ozone concentration in a storage compartment of the refrigerator, which cannot effectively play a role of removal of pesticide residues and sterilization. In the way of using ozone water, ozone is dissolved into water of a pool; fruits and vegetables are put into the pool for immersion. This method can effectively remove the pesticide residues, and has higher efficiency. However, a large amount of water needs to be prepared in advance, which will cause a waste and bring inconvenience to the use in the refrigerator.

BRIEF DESCRIPTION OF THE INVENTION

In view of the above-mentioned problems, the present invention is proposed to provide a pesticide residue removal device for a refrigerator, and a refrigerator which overcome the above problems or at least partially solve the above problems.

One further objective of the present invention is to atomize prepared ozone water to improve the pesticide residue removal rate in a refrigerator.

Another further objective of the present invention is to prepare ozone water on demand to effectively avoid waste.

Particularly, the present invention provides a pesticide residue removal device for a refrigerator, including:

an ozone generator configured to generate ozone;

an ozone water container configured to store water, wherein the ozone water container communicates with the ozone generator, so that ozone is dissolved into water of the ozone water container to obtain ozone water; and an atomizer communicating to the ozone water container, receiving and atomizing the ozone water, and supplying same to a storage space of the refrigerator.

Optionally, the ozone water container includes a water inlet connected to an external water inlet pipe or a defrosted water outlet pipe of the refrigerator to supply external water or defrosted water of the refrigerator to the ozone water container.

Optionally, a water inlet valve is arranged at the position of the water inlet; and the water inlet valve is controlled to be opened and closed to control on and off of a water flow supplied to the ozone water container.

Optionally, the atomizer is provided with an atomization outlet; and the ozone water is supplied to the storage space of the refrigerator through the atomization outlet after being atomized.

Optionally, the ozone generator is attached to a top of the ozone water container, an ozone outlet is formed in an attached position of the ozone generator and the ozone water container, and the ozone generator supplies ozone to the ozone water container through the ozone outlet; and the atomizer is attached to a side wall of the ozone water container, an ozone water outlet is formed in an attached position of the atomizer and the ozone water container, and the ozone water container supplies ozone water to the atomizer through the ozone water outlet.

Optionally, the ozone generator is further configured to work during the outage of a compressor of the refrigerator at an interval of a preset time range from the startup and/or stop time of the compressor of the refrigerator.

The present invention also provides a refrigerator, which includes:

a cabinet in which a storage compartment is defined;

any of the above-mentioned pesticide residue removal devices for a refrigerator which is arranged inside the storage compartment.

Optionally, the refrigerator further includes:

a storage drawer arranged inside the storage compartment, where the pesticide residue removal device is attached to the storage drawer.

Optionally, the pesticide residue removal device is attached to a side wall of the storage drawer.

Optionally, the refrigerator further includes a control device. The control device is configured to:

determine a water injection amount and an ozone injection amount on the basis of a volume value or a weight value of an object to be subjected to pesticide residue removal placed in the storage drawer; and/or control the water inlet valve to supply, according to the water injection amount, water to the ozone water container; and/or control the ozone generator to supply, according to the ozone injection amount, ozone to the ozone water container.

The present invention provides a pesticide residue removal device for a refrigerator, and a refrigerator. The ozone generator communicates to the ozone water container; and the ozone water container communicates to the atomizer. Therefore, the ozone generated by the ozone generator can enter the ozone water container and be dissolved into the water of the ozone water container, so that ozone water can be prepared, and the ozone water can then enter the atomizer. The atomizer can atomize the ozone water and supply it to the storage space of the refrigerator. Based on the solutions provided by the present invention, the pesticide residue removal device can be applied to the refrigerator and is convenient to use in the refrigerator. The generated ozone water can be effectively made to uniformly fill the entire storage space of the refrigerator after the ozone water is atomized, so that effective pesticide residue removal and sterilization can be performed on fruits, vegetables, and other items; the pesticide residue removal effect is better; the pesticide residue removal rate is effectively increased; and at the same time, the ozone is dissolved into water mist, so that people are well prevented from getting harmed at an excessive ozone concentration.

Further, the pesticide residue removal device of the present invention has a compact structure, is conveniently integrated in the refrigerator, does not occupy too much of the storage space of the refrigerator, and is conductive to storage and pesticide residue removal of the objects such as fruits and vegetables in the refrigerator.

Furthermore, in the solutions of the present invention, the ozone water can be prepared on demand according to the quantity of the objects such as fruits and vegetables in the storage drawer, without causing waste.

The above and other objectives, advantages, and features of the present invention will be better understood by those skilled in the art according to the following detailed description of specific embodiments of the present invention in conjunction with the accompanying drawings.

BRIEF DESCRIPTION OF THE DRAWINGS

In the following part, some specific embodiments of the present invention will be described in detail in an exemplary rather than limited manner with reference to the accompanying drawings. The same reference numerals in the accompanying drawings indicate the same or similar components or parts. Those skilled in the art should understand that these accompanying drawings are not necessarily drawn to scale. In the drawings.

DETAILED DESCRIPTION

Figure 1:
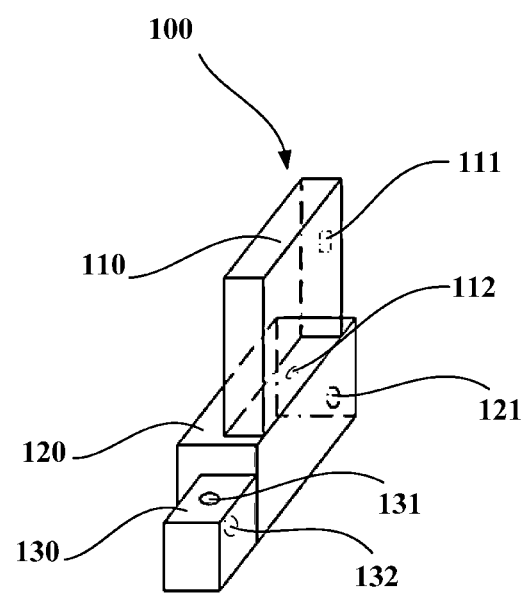
FIG. 1 is a schematic perspective of a pesticide residue removal device for a refrigerator according to one embodiment of the present invention.

Exemplary embodiments of the present invention will be described in more detail below with reference to the accompanying drawings. Although the exemplary embodiments of the present invention are shown in the drawings, it should be understood that the present invention can be implemented in various forms and should not be limited by the embodiments set forth herein. On the contrary, these embodiments are provided to enable a more thorough understanding of the present disclosure and to fully deliver the scope of the present disclosure to those skilled in the art.

FIG. 1 is a schematic structural diagram of a pesticide residue removal device 100 for a refrigerator according to one embodiment of the present invention. Referring to FIG. 1, the pesticide residue removal device 100 may include an ozone generator 110, an ozone water container 120, and an atomizer 130. The ozone generator 110 can be configured to generate ozone. The ozone water container 120 can be configured to store water, and the ozone water container 120 communicates with the ozone generator 110, so that the ozone generated by the ozone generator 110 can be dissolved into water of the ozone water container 120, so as to obtain ozone water. The atomizer 130 communicates to the ozone water container 120, and can receive and atomize the ozone water and supply it to a storage space of the refrigerator.

In the embodiment of the present invention, the ozone generator 110 communicates to the ozone water container 120; and the ozone water container 120 communicates to the atomizer 130. Therefore, the ozone generated by the ozone generator 110 can be conveyed to the ozone water container 120 and be dissolved into the water of the ozone water container 120, so that ozone water can be prepared, and the ozone water can be then conveyed into the atomizer 130. The atomizer 130 can atomize the ozone water and supply it to the storage space of the refrigerator. Based on the pesticide residue removal device 100 provided by the embodiment of the present invention, on the one hand, the pesticide residue removal device can be applied to the refrigerator and is convenient to use in the refrigerator. On the other hand, the generated ozone water can be effectively made to uniformly fill the entire storage space of the refrigerator after the ozone water is atomized, so that effective pesticide residue removal and sterilization can be performed on fruits, vegetables, and other items; the pesticide residue removal effect is better; the pesticide residue removal rate is effectively increased; and at the same time, the ozone is dissolved into water mist, so that people are well prevented from getting harmed at an excessive ozone concentration.

The ozone generator 110 needs to be charged during working. In one embodiment, a power supply 111 may be provided on the ozone generator 110, and may be used to power the ozone generator 110, so that the ozone generator 110 works to generate ozone. The ozone generator 110 is powered by the power supply 111 provided on the ozone generator 110, so that a power supply line is short, which can reduce the cost.

In another embodiment, the ozone generator 110 can be further configured to work during the outage of a compressor of the refrigerator at an interval of a preset time range or more from the startup and/or stop time of the compressor of the refrigerator. For example, the operation of the ozone generator 110 may be at an interval of the preset time range or more from the startup time of the compressor of the refrigerator. For another example, the operation of the ozone generator 110 may be at an interval of the preset time range or more from the stop time of the compressor of the refrigerator. For another example, the operation of the ozone generator 110 may be at an interval of the preset time range or more respectively from the startup time and the stop time of the compressor of the refrigerator, that is, within the preset time range before and after each operation of the ozone generator 110, the compressor of the refrigerator is in an outage period. The preset time range can be set as required, for example, the preset time range is 10 minutes, which is not limited in the present invention.

In one embodiment, the ozone water container 120 may include a water inlet 121. The water inlet 121 may be connected to an external water inlet pipe or a defrosted water outlet pipe of the refrigerator, so as to supply external water or defrosted water of the refrigerator to the ozone water container 120. In this embodiment, the water inlet 121 can be connected to the external water inlet pipe, which makes it more convenient and quicker to inject water into the ozone water container 120, and provides convenience for the subsequent preparation of the ozone water. The water inlet 121 can also be connected to the defrosted water outlet pipe of the refrigerator, so that the ozone water container 120 can also receive the defrosted water of the refrigerator to prepare the ozone water. Using the defrosted water of the refrigerator to prepare the ozone water is beneficial to full utilization of water resources and saving resources.

A water inlet valve 122 can be arranged at the position of the water inlet 121. The water inlet valve 122 can be controlled to be opened and closed to control on and off of a water flow supplied to the ozone water container 120. The water inlet valve 122 controls the on and off of the water flow supplied to the ozone water container 120, so that the water injection amount can be effectively controlled; the preparation of the ozone water is controllable; and waste is effectively avoided.

In other embodiments, the water inlet valve 122 may alternatively be disposed at any position of the external water inlet pipe or the defrosted water outlet pipe of the refrigerator, such as an end thereof close to the water inlet 121 or an end thereof away from the water inlet 121.

In some embodiments, the atomizer 130 can be provided with an atomization outlet 131. The ozone water is supplied to the storage space of the refrigerator through the atomization outlet 131 after being atomized.

After the ozone water is atomized, ozone water mist can be formed. The atomization outlet 131 is preferably arranged on a top of the atomizer 130. In this embodiment, the ozone water mist sent from the atomizer can be sent upwards from the atomization outlet 131, so that the ozone water mist in the storage space of the refrigerator is more uniform, which is conducive to full contact with fruits, vegetables and other items, and further enhances the effect of pesticide residue removal and sterilization on the fruits, vegetables and other items.

In some embodiments, the ozone generator 110 can be attached to a top of the ozone water container 120. Furthermore, an ozone outlet 112 is formed in an attached position of the ozone generator 110 and the ozone water container 120. The ozone generator 110 supplies ozone to the ozone water container 120 through the ozone outlet 112. The atomizer 130 can be attached to a side wall of the ozone water container 120, an ozone water outlet 132 is formed in an attached position of the atomizer 130 and the ozone water container 120, and the ozone water container 120 supplies ozone water to the atomizer 130 through the ozone water outlet 132. Based on the solution provided in this embodiment, the ozone generator 110, the ozone water container 120, and an atomization device are compact in structure and small in volume, and do not occupy much space, which is beneficial to saving the storage space of the refrigerator and facilitating the storage of more fruits, vegetables, and other food to enhance the use experience of users.

In some other embodiments, the atomizer 130 can alternatively be inserted into the ozone water container 120. At this time, at least a part of the atomizer 130 is located in the ozone water container 120, and an ozone water outlet 132 is formed in the part of the atomizer 130 located in the ozone water container 120.

Figure 2:
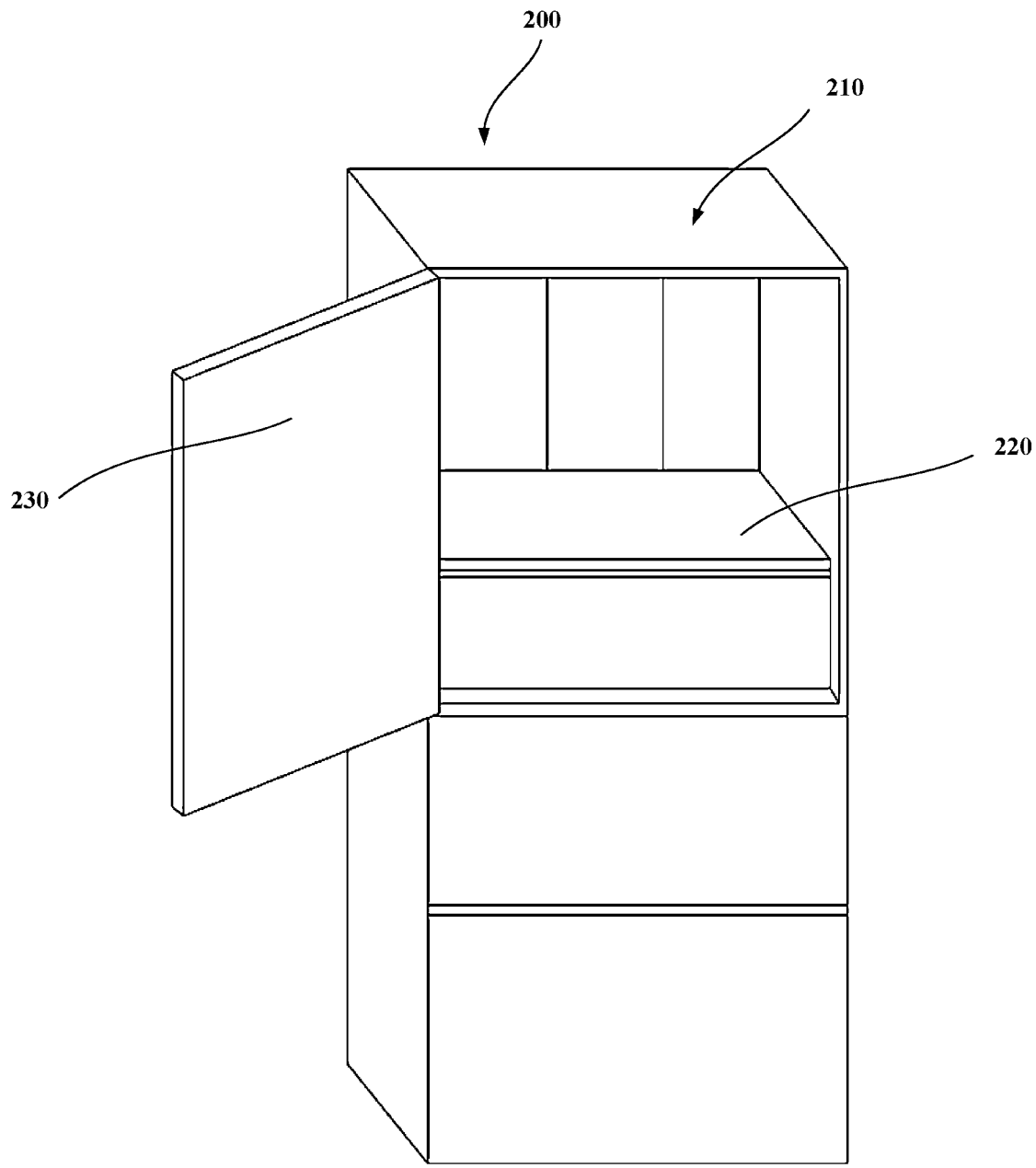
FIG. 2 is a schematic structural view of a refrigerator according to one embodiment of the present invention.

FIG. 2 is a schematic structural view of a refrigerator 200 according to one embodiment of the present invention. Referring to FIG. 2, in one embodiment, the refrigerator 200 may include a cabinet 210 in which a storage compartment is defined; and the pesticide residue removal device 100 for the refrigerator 200 in any one of the above embodiments, which is arranged inside the storage compartment.

In this embodiment, the pesticide residue removal device 100 can be integrated into the refrigerator 200, thereby adding functions of pesticide residue removal and sterilization to the refrigerator 200. Thus, effective pesticide residue removal and sterilization can be performed on fruits, vegetables and other food placed in the refrigerator 200 to ensure the food safety.

In one embodiment, the refrigerator 200 may further include a storage drawer 220. The storage drawer 220 may be disposed inside the storage compartment defined in the cabinet. Further, the pesticide residue removal device 100 is attached to the storage drawer 220. In this embodiment, the pesticide residue removal device 100 is attached to the storage drawer 220, so that a storage space of the storage drawer 220 is larger, which is helpful to store more food, and can also be specially designed for removing the pesticide residues from and sterilizing fruits, vegetables and other food in the storage drawer 220.

The storage drawer is preferably a sealed drawer. The use of the sealed drawer can reduce the escape of the ozone water mist, which is safe and can reduce waste. At the same time, the sealed drawer is also helpful for freshness retaining of food.

In some embodiments, the refrigerator 200 may include a door body 230.

Figure 3:
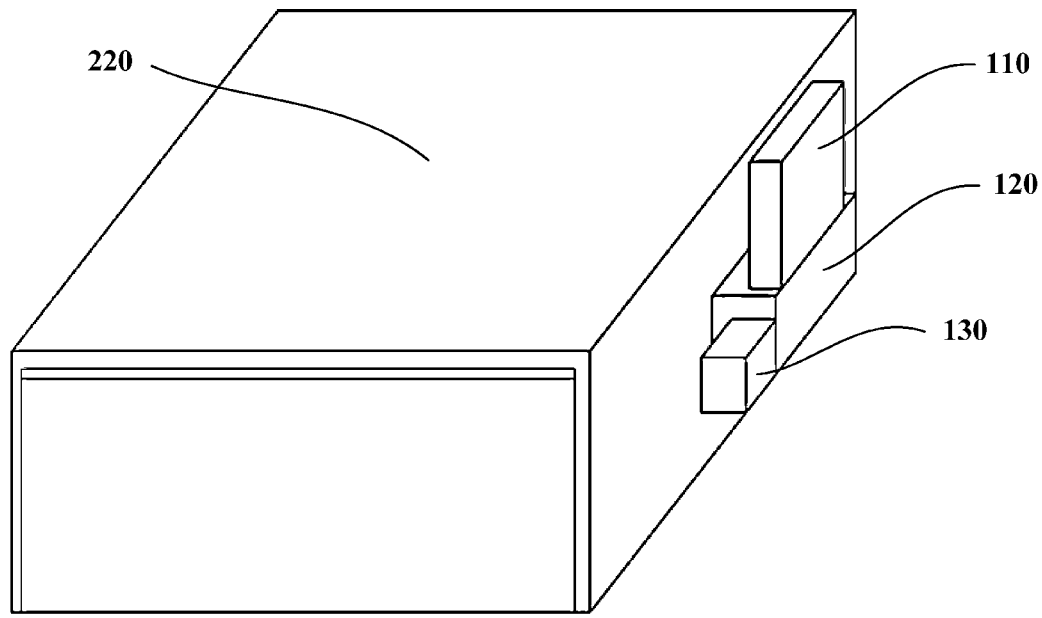
FIG. 3 is an enlarged schematic structural diagram of a storage drawer and a pesticide residue removal device in the refrigerator shown in FIG. 2.

FIG. 3 is an enlarged schematic structural diagram of the storage drawer 220 and the pesticide residue removal device 100 in the refrigerator 200 shown in FIG. 2. Referring to FIG. 3, the pesticide residue removal device 100 can be attached to a side wall of the storage drawer 220. Therefore, the layout of the pesticide residue removing device 100 is more reasonable, and the pesticide residue removal device 100 can be effectively prevented from occupying much space, thereby saving the storage space of the refrigerator 200 to store more food. The pesticide residue removal device 100 can alternatively be attached to an inner side wall of the storage drawer 220.

Figure 4:
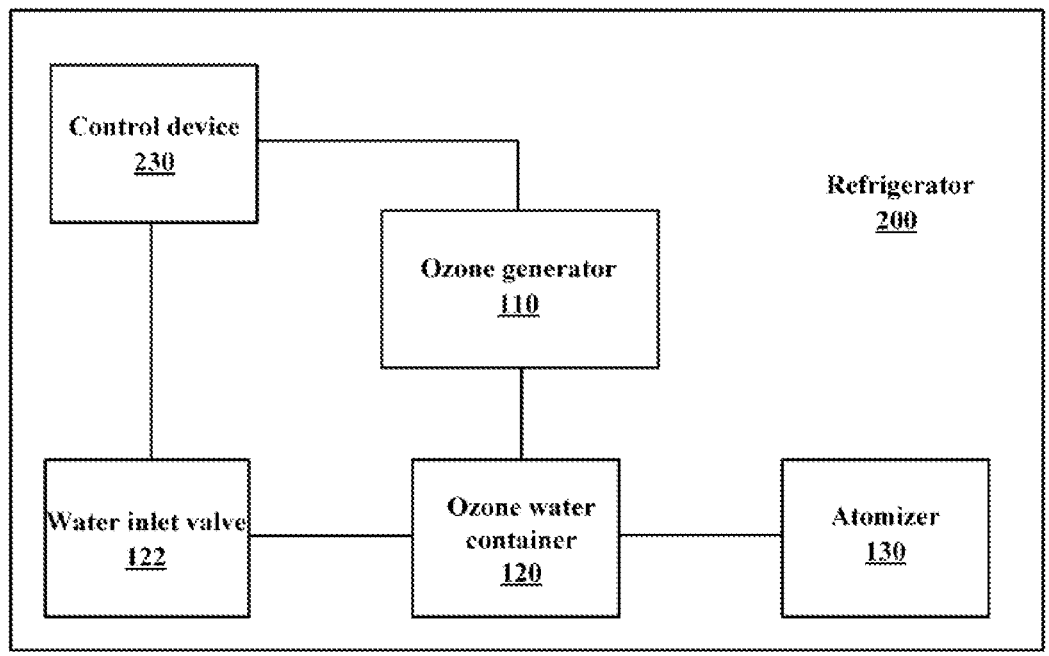
FIG. 4 is a schematic structural diagram of a refrigerator according to another embodiment of the present invention.

FIG. 4 is a schematic structural diagram of a refrigerator 200 according to another embodiment of the present invention. Referring to FIG. 3, the refrigerator 200 may further include a control device 230 that may be configured to: determine a water injection amount and an ozone injection amount on the basis of a volume value or a weight value of an item to be subjected to pesticide residue removal placed in the storage drawer 220; and/or control the water inlet valve 122 to supply, according to the water injection amount, water to the ozone water container 120; and/or control the ozone generator 110 to supply, according to the ozone injection amount, ozone to the ozone water container 120.

In this embodiment, the control device 230 may determine the water injection amount and the ozone injection amount on the basis of the volume value or weight value of the item to be subjected to pesticide residue removal in the storage drawer 220, and then control, according to the water injection amount and the ozone injection amount, the water inlet valve 122 and the ozone generator 110 to work, thus preparing ozone water on demand and reducing waste.

In some embodiments, the control device 230 may also be configured to control, by controlling the power supply 111 to be turned on and turned off, whether to charge the ozone generator 110.

In some other embodiments, the control device 230 may also be configured to control the operation of the atomizer 130. Specifically, the control device 230 can control the atomizer 130 to receive the ozone water, and control the atomizer 130 to atomize the received ozone water and supply it to the storage drawer 220, so that the ozone in the atomized ozone water is used to achieve pesticide residue removal and sterilization.

The present invention provides a pesticide residue removal device for a refrigerator, and a refrigerator. The ozone generator communicates to the ozone water container; and the ozone water container communicates to the atomizer. Therefore, the ozone generated by the ozone generator can enter the ozone water container and be dissolved into the water of the ozone water container, so that ozone water can be prepared, and the ozone water can then enter the atomizer. The atomizer can atomize the ozone water and supply it to the storage space of the refrigerator. Based on the solutions provided by the present invention, the pesticide residue removal device can be applied to the refrigerator and is convenient to use in the refrigerator. The generated ozone water can be effectively atomized into ozone water mist that uniformly fills the entire storage space of the refrigerator, so that effective pesticide residue removal and sterilization can be performed on fruits, vegetables, and other items; the pesticide residue removal effect is better; the pesticide residue removal rate is effectively increased; and at the same time, the ozone is dissolved into water mist, so that people are well prevented from getting harmed at an excessive ozone concentration.

Further, the pesticide residue removal device of the present invention has a compact structure, is conveniently integrated in the refrigerator, does not occupy too much of the storage space of the refrigerator, and is conductive to storage and pesticide residue removal of the objects such as fruits and vegetables in the refrigerator.

Much further, in the solutions of the present invention, the ozone water can be prepared on demand according to the quantity of the objects such as fruits and vegetables in the storage drawer, without causing waste.

It should be finally noted that the above various embodiments are only used to describe the technical solutions of the present invention, and not intended to limit the present invention. Although the present invention has been described in detail with reference to the foregoing embodiments, those ordinarily skilled in the art should understand that within the spirit and principle of the present invention, they can still modify the technical solutions described in all the foregoing embodiments, or equivalently replace some or all of the technical features. These modifications or replacements will not make the corresponding technical solutions depart from the protection scope of the present invention.

What is claimed is:

1. A pesticide residue removal device for a refrigerator, comprising:
    an ozone generator configured to generate ozone;
    an ozone water container configured to store water, wherein the ozone water container communicates with the ozone generator, so that ozone is dissolved into water of the ozone water container to obtain ozone water; and
    an atomizer communicating to the ozone water container, receiving and atomizing the ozone water, and supplying the ozone water to a storage space of the refrigerator,
    wherein the ozone generator is attached to a top of the ozone water container, an ozone outlet is formed in an attached position of the ozone generator and the ozone water container, and the ozone generator supplies ozone to the ozone water container through the ozone outlet without a conduit between the ozone outlet and the ozone water container;
    wherein the atomizer is attached to a side wall of the ozone water container, with an ozone water outlet being formed in an attached position of the atomizer and the ozone water container, or the atomizer is inserted into the ozone water container, with at least a part of the atomizer being located in the ozone water container and an ozone water outlet being formed in the part of the atomizer located in the ozone water container, and the ozone water container supplies ozone water to the atomizer through the ozone water outlet; and
    wherein the atomizer comprises an atomization outlet arranged on a top of the atomizer, such that an ozone water mist formed by atomizing the ozone water is sent from the atomizer upwards from the atomization outlet into the storage space of the refrigerator.

2. The pesticide residue removal device for the refrigerator according to claim 1, wherein
    the ozone water container comprises a water inlet connected to an external water inlet pipe or a defrosted water outlet pipe of the refrigerator to supply external water or defrosted water of the refrigerator to the ozone water container.

3. The pesticide residue removal device for the refrigerator according to claim 2, wherein
    a water inlet valve is arranged at the position of the water inlet; and the water inlet valve is controlled to be opened and closed to control on and off of a water flow supplied to the ozone water container.

4. The pesticide residue removal device for the refrigerator according to claim 1, wherein
    the ozone generator is further configured to work during the outage of a compressor of the refrigerator at an interval of a preset time range from a startup and/or stop time of the compressor of the refrigerator.

5. A refrigerator, comprising:
    a cabinet, in which a storage compartment is defined;
    the pesticide residue removal device for a refrigerator according to claim 1, which is arranged inside the storage compartment.

6. The refrigerator according to claim 5, further comprising:
    a storage drawer arranged inside the storage compartment, wherein the pesticide residue removal device is attached to the storage drawer.

7. The refrigerator according to claim 6, wherein
    the pesticide residue removal device is attached to a side wall of the storage drawer.

8. The refrigerator according to claim 6, further comprising a control device, wherein the ozone water container comprises a water inlet and a water inlet valve which is arranged at the position of the water inlet and controlled to be opened and closed to control on and off of a water flow supplied to the ozone water container, the control device being configured to:
    determine a water injection amount and an ozone injection amount on the basis of a volume value or a weight value of an object to be subjected to pesticide residue removal placed in the storage drawer; and
    control the water inlet valve to supply, according to the water injection amount, water to the ozone water container; and/or
    control the ozone generator to supply, according to the ozone injection amount, ozone to the ozone water container.

* * * * *